United States Patent
Lee et al.

(10) Patent No.: US 6,243,595 B1
(45) Date of Patent: Jun. 5, 2001

(54) PORTABLE WIRELESS COMMUNICATION DEVICE HAVING AN EXTENDIBLE SECTION

(75) Inventors: Michael C. G. Lee; Arlan J. Anderson; Michael J. Craven, all of Ottawa; Henry C. Mok, Kanata, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/097,592

(22) Filed: Jun. 16, 1998

(51) Int. Cl.[7] ....................................... H04B 1/38
(52) U.S. Cl. ............................. 455/566; 455/90; 455/575
(58) Field of Search ............................. 455/90, 550, 575, 455/566; 379/368, 433; 341/26

(56) References Cited

U.S. PATENT DOCUMENTS

| | | | |
|---|---|---|---|
| D. 370,673 | * 6/1996 | Happo et al. | D14/138 |
| D. 386,493 | * 11/1997 | Mahan | D14/138 |
| D. 390,555 | 2/1998 | Kinle-Anlauff | D14/138 |
| 4,322,728 | 3/1982 | Ginn | 340/870.38 |
| 4,725,816 | 2/1988 | Petterson | 341/24 |
| 5,151,946 | 9/1992 | Martensson | 379/58 |
| 5,335,274 | * 8/1994 | Masuda et al. | 379/433 |
| 5,369,788 | 11/1994 | Nagai | 455/90 |
| 5,450,619 | * 9/1995 | Maeda | 455/566 |
| 5,485,517 | 1/1996 | Gray | 379/433 |
| 5,584,054 | 12/1996 | Tyneski et al. | 455/89 |
| 5,630,211 | 5/1997 | Nagai | 455/89 |
| 5,657,370 | * 8/1997 | Tsugane et al. | 455/550 |
| 5,715,524 | 2/1998 | Jambhekar et al. | 455/90 |
| 5,798,716 | * 8/1998 | Davis | 379/368 |
| 5,956,625 | * 9/1999 | Hansen et al. | 455/90 |

* cited by examiner

*Primary Examiner*—Daniel Hunter
*Assistant Examiner*—Darnell Armstrong
(74) *Attorney, Agent, or Firm*—Dennis R. Haszko; Smart & Biggar (57) ABSTRACT

A portable cellular telephone comprising a main body for housing at least a microcontroller, a display screen, an audio receiver and a microphone. An extendible section that houses a number of function keys such as the standard telephone keys, slides out of the main body to expose the display screen in its entirety. The extendible section also includes LED's to back light the keys when desirable. The electrical connections between the extendible section and the main body are achieved through wiper contacts in the main body that slide over conductive strips on the under surface of the extendible section. The keys in the extendible section are each connected to resistors of different values, these resistor/key combinations are all connected in parallel to two conductive strips. A resistor bridge is formed by connecting a resistor in the main body to the resistor key combinations. The voltage change at the junction between the resistor and the combinations is detected to sense the closure of a key, and the voltage value is used to identify the key that is closed. The device also detects when the extendible section is in the open or closed positions. The extendible section is mounted such that it will detach from the main body when a force is applied to it such as by dropping the telephone; the section may be simply replaced by snapping it back into place without damage to the telephone.

15 Claims, 5 Drawing Sheets

PORTABLE WIRELESS COMMUNICATION DEVICE HAVING AN EXTENDIBLE SECTION

FIELD OF INVENTION

This invention relates to portable wireless communications devices, and in particular to those that have a display screen, audio transducers and a user input component on an extendible section of the device.

BACKGROUND OF THE INVENTION

User input components having selection keys are used in communications devices, such as portable wireless devices, to permit a user to supply information to operate the device as well as to provide information to be transmitted by the device. Conventionally, the device consists of a user input component mounted on the main body of the device and electrically connected by wires to a controller module located within the main body. The device usually also includes a display component located on an external surface of the main body and electrically connected to the controller module for conveying information to the user of the device.

With the increasing need for greater functionality in the operation of portable communications devices, it is desirable that they include relatively large display screens and a substantial number of control keys. In addition, there is an increasing demand that the portable devices remain small, light and robust, and that the devices should take up little room particularly when they are not in use.

In order to meet these needs, portable devices have been developed that consist of a main body and an extendible section that will temporarily expand the size of the device. One general type of such a device is described in U.S. Pat. No. 5,151,946 which issued on Sep. 29, 1992 to Martensson, U.S. Pat. No. 5,369,788 which issued on Nov. 29, 1994 to Nagai, U.S. Pat. No. 5,450,619 which issued on Sep. 12, 1995 to Maeda and U.S. Design Pat. No. Des. 390,555 which issued on Feb. 10, 1998 to Finke-Anlauff. The first two patents and the design patent describe a device having an extendible section that houses the device microphone. The third patent describes a device in which the extendible section houses the device receiver. The respective microphones and receiver described in the three patents are physically wired to the control module in the main body of the device whereas the microphone in the design patent is connected to the control module through sliding contacts. These arrangements provide very little added space for other components such as the display screen on the devices since only a small microphone or receiver are eliminated from the main body of the device.

U.S. Pat. No. 5,485,517 which issued on Jan. 16, 1996 to Gray and U.S. Pat. No. 5,630,211 which issued on May 13, 1997 to Nagai both describe devices with hinged extendible sections on which are located a number of input keys and the device microphone. These devices allow for a relatively large screen on the main body of the device. In the first patent, the section swivels with respect to the main body and in the second patent, the section is hinged to swing open. In both patents, the keys and microphone are electrically connected to the control module in the main body by flexible wires that, with use, have a tendency to snag and break.

The above disadvantage is overcome in U.S. Pat. No. 5,584,054 which issued on Dec. 10, 1996 to Tyneski et al and U.S. Pat. No. 5,715,524 which issued on Feb. 3, 1998 to Jambhekar et al. These patents describe a device having a flap on which a number of input keys are located; however the keys are not wired to the main body. The keys are operational when the flap is closed since in this position the keys make physical contact with the touch sensitive screen. Though potential wiring problems are eliminated, the keys are of limited use since they can only be used when the flap is closed over the screen.

SUMMARY OF THE INVENTION

It is therefore an object of the present invention to provide a portable wireless communications device having a main body with a relatively large display screen and an extendible section for the user input component.

It is another object of this invention to provide a portable wireless communications device having a main body and a sliding extendible section that is electrically connected to the main body through a limited number of contacts.

It is a further object of this invention to provide a portable wireless communications device having a main body and a sliding extendible section that is detachable from the main body such that it can be readily reassembled.

It is a further object of this invention to provide a portable wireless communications device which is operable whether the sliding extendible section is in the extended or non-extended position.

These and other objects are achieved in a portable wireless communications device which includes a main body having at least a microcontroller and a display screen connected to the microcontroller. The device would also normally include an audio receiver mounted at one end of the main body and a microphone mounted at the other end. An extendible section is slidably mounted in the main body to cover a large portion of the display screen when in the closed position and extending from the main body to an open position to uncover the display screen. The extendible section has a user input component mounted on it and is electrically connected to the microcontroller. The user input component may consist of a series of function keys used to operate the device or to input information for transmission from the device.

In accordance with one aspect of this invention each key is connected in series with a resistor of different size and the key/resistor combinations are connected in parallel between two leads, the two leads are electrically connected to a circuit within the main body for identifying closed keys.

In accordance with a further aspect of this invention, the extendible section is planar. The function keys are mounted on the top planar surface and two elongated parallel conductive strips are fixed to the bottom planer surface parallel to the direction of movement of the extendible section. The conductive strips are in contact with wiper contacts that are mounted within the main body and are electrically connected to the circuit within the main body for identifying closed keys.

In accordance with another aspect of this invention, the extendible section further includes a series of light emitting diodes mounted to illuminate the keys. The light emitting diodes are connected to two further elongated parallel conductive strips fixed to the bottom planer surface parallel to the direction of movement of the extendible section, the conductive strips are in contact with two further wiper contacts mounted within the main body and electrically connected to a power supply.

In accordance with a further aspect of this invention, a fifth elongated conductive strip divided into two sections along its length is fixed to the bottom planer surface parallel to the direction of movement of the extendible section, the conductive strip is in contact with a further wiper contact mounted within the main body and electrically connected to circuits within the main body to determine whether the extendible section is in the open or closed position.

In accordance with another aspect of this invention, the extendible section is detachably connected to the main body allowing it to be detached on the application of a significant force to it and subsequently to simply be reattached without damage to the device. The detachable extendible section is planar having a user input component mounted on a top planar surface and at least two elongated parallel conductive strips fixed to the bottom planer surface parallel to the direction of movement of the extendible section. The conductive strips are in contact with wiper contacts mounted within the main body to electrically connect the user input component to the microcontroller.

In accordance with a further aspect of this invention, the closed key identifying circuit includes a resistor which forms a resistor divider with the key/resistor combinations. A detector detects the voltage between the resistor and the key/resistor combinations to identify the closed key.

In accordance with yet another aspect of this invention, the device includes a circuit for sensing the closure of any one of the function keys. The key closure sensing circuit includes a comparator having first and second inputs. The voltage between the resistor and the key/resistor combination is applied to the first input to produce a comparator output when the first input voltage is less than a fixed voltage applied to the second input. The comparator output is applied to the microcontroller to activate the communications device as the result of a closed key.

Many other objects and aspects of this invention will be clear from the detailed description of the drawings.

BRIEF DESCRIPTION OF THE DRAWINGS

Embodiments of the invention are described in the drawings in which.

DETAILED DESCRIPTION

Figure 1:
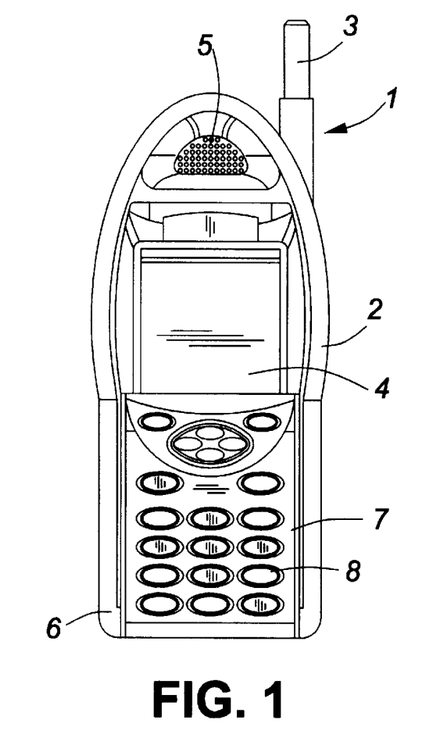
FIG. 1 schematically illustrates in front view the portable wireless communications device with the sliding extendible section in the closed or non-extended position in accordance with the present invention.
Figure 2:
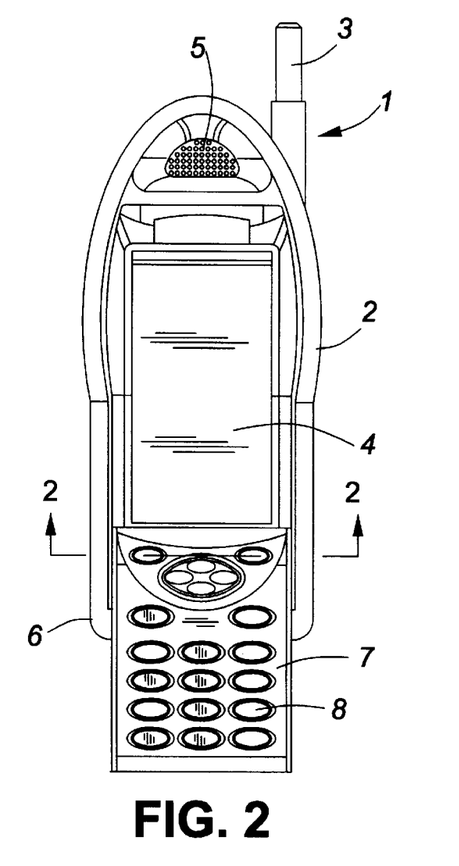
FIG. 2 schematically illustrates in front view the portable wireless communications device with the sliding extendible section in the open or extended position in accordance with the present invention.
Figure 3:
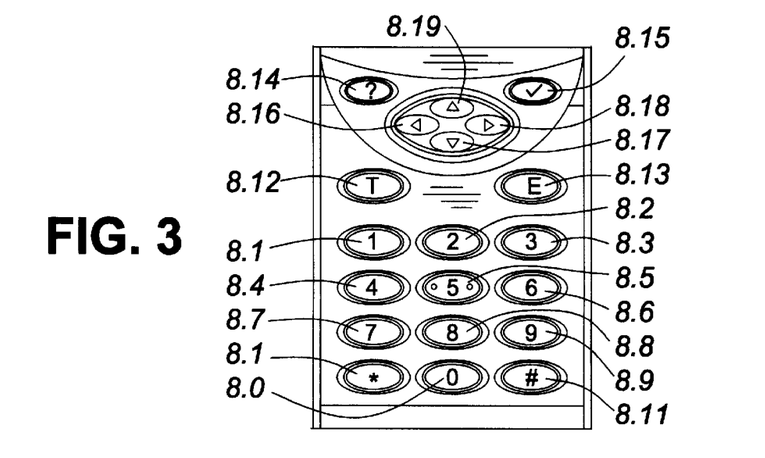
FIG. 3 illustrates the keypad layout.

FIGS. 1 and 2 illustrate a wireless communications device 1 such as a portable cellular telephone in the closed and open positions respectively in accordance with the present invention. The device 1 includes a main body 2 that houses standard components such as a processor, communications module, memory, controller and battery, all of which are not seen from the outside. The main body 2 also includes an antenna 3, a display screen 4 and audio transducers, i.e. a receiver 5 and a microphone 6 that is mounted within a cavity on the side of the body 2. The device 1 further includes an extendible section 7 that slides out of the main body as shown in FIG. 2. The extendible section 7 covers a large portion of the display screen 5, protecting it when in the closed position. In this particular application, 20 function keys 8 are located on the extendible section 7, however, the number of keys may vary depending on the particular application. The present 20 key layout is illustrated in FIG. 3. Keys 8.0 to 8.9 represent the telephone pad numbers 0 to 9, 8.10 is the *, 8.11 is the #, 8.12 is the "Talk" key, 8.13 is the "End" key, 8.14 is the "Help" key, 8.15 is the "Mode" key and 8.15 to 8.19 are the cursor direction keys.

Figure 4:
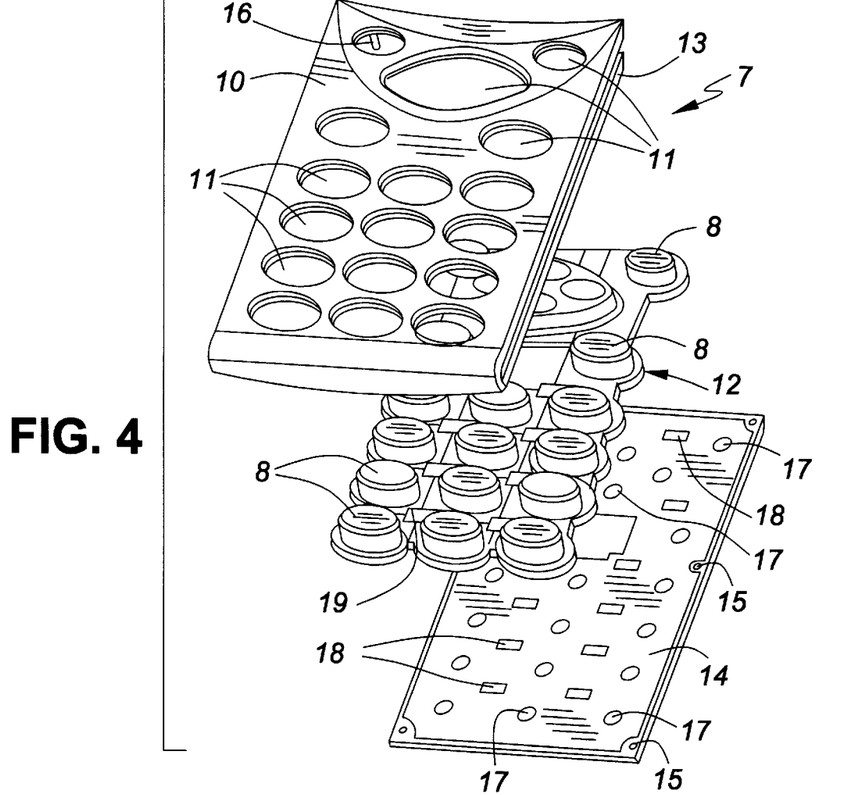
FIG. 4 illustrates in exploded view the components of the sliding extendible section.

FIG. 4 shows the extendible section 7 in exploded view which, in the present embodiment, essentially constitutes the keypad for the wireless communications device 1. Section 7 includes a casing 10 molded from a rigid material such as a polycarbonate impregnated with teflon with openings 11 to receive the keys 8 protruding from an keypad elastomer 12. Section 7 includes flanges molded into each side edge 13 for mounting within corresponding channels within the main body 2. The teflon in the polycarbonate makes the flanges self-lubricating to allow the extendible section 7 to slide more readily within the channels on the main body 2. The keypad elastomer 12 consists of a silicon rubber key mat 19 that covers a polyamide dome sheet. The dome sheet has conductive carbon pads under the keypad elastomer 12 for shorting across finger key contacts 17 on a printed circuit board 14. The printed circuit board 14 is fixed to the casing 10 by heat stakes 16 that pass through openings 15 in board 14. The circuit board 14 includes finger key contacts 17, LED's 18 and associated circuitry to be described in conjunction with FIG. 10.

Figure 5:
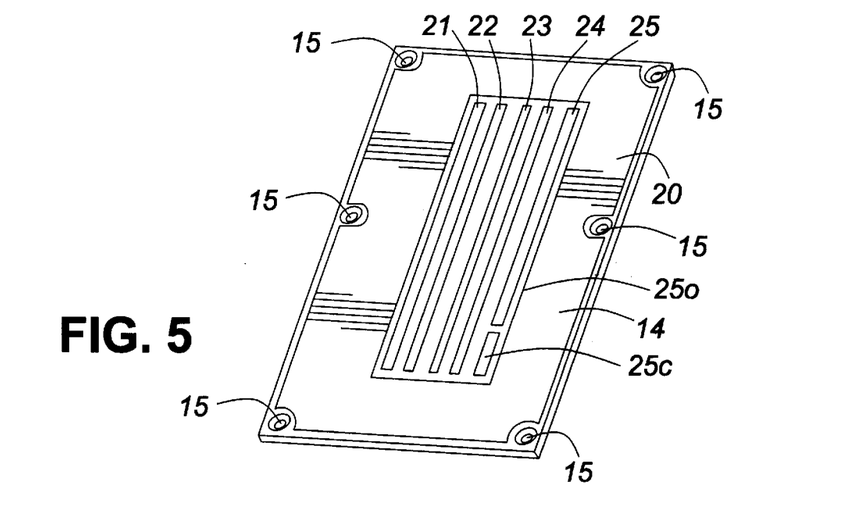
FIG. 5 illustrates the back of the circuit board from the sliding extendible section.

The reverse side of the circuit board 14 shown in FIG. 5 includes, in this particular embodiment, 5 elongated parallel conductive strips 21, 22, 23, 24 and 25 deposited by conventional deposition techniques onto the board 14. The strips are located on the board 14 so as to be parallel to the sliding direction of the extendible section 7 within the main body 2. The strips 21 to 25 are electrically connected to the associated circuitry on the board 14 and constitute the contacts for connection to circuits in the main body 2 through wiper contacts that will be described in conjunction with FIGS. 6 and 7. It is to be noted that strip 25 is made up of two sections 25c and 25o electrically isolated from one another. In order to provide conductors that will withstand repeated use through sliding contact with the wiper contacts, each strip consists of a layer of copper on the printed circuit board, followed by a layer of nickel and finished with cobalt hardened gold. The strips 21 to 25 are further finished as smooth as is practicable and lubricated with a conductive contact lubricant to prevent wear. In addition, for protection and appearance, the back of the circuit board 14 is coated with a black solder mask 20 except on the conductive strips 21 to 25.

Figure 6:
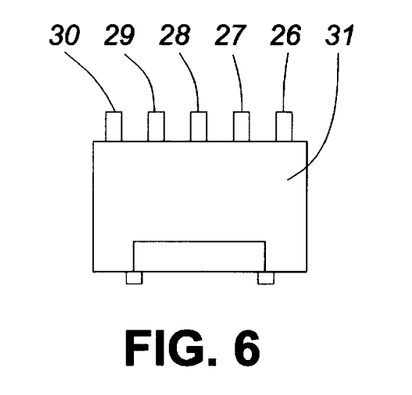
FIG. 6 illustrates in side view a block of contacts mounted in the main body of the device for contact with the circuit board.

In FIG. 6, wiper contacts 26, 27, 28, 29 and 30 are shown mounted within but protruding from a non-conductive block 31 that itself is adapted to be mounted within the main body 2 of the device 1. In this manner, each of the contacts 26 to 30 slides on one of the conductive strips 21 to 25 respectively to be in continuous electrical contact when the extendible section 7 is moved from one position to another. Wiper contacts 26 to 30 are wired to corresponding circuitry within the main body 2. In the case of wiper contact 30, it is in contact with strip section 25c when the extendible section 7 is in the closed (non-extended) position and it is in contact with strip section 25o when the extendible section 7 is in the partially or totally opened (extended) position.

Figure 7:
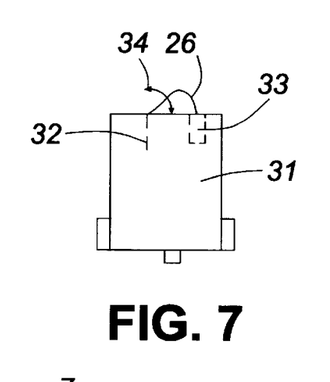
FIG. 7 illustrates in end view one example of wiper contacts used with the present invention.

As illustrated in side view in FIG. 7, wiper contact 26 consists of a blade of spring material with one end 32 fixed within block 31 and the other end 33 allowed to move freely. The spring material causes the blade 26 to be biased in a direction away from the block 31 and when deflected to rotate as shown by arrow 34 about an axis created by the fixed end 32. The other contacts 27 to 30 are constructed in a similar manner.

Figure 8:
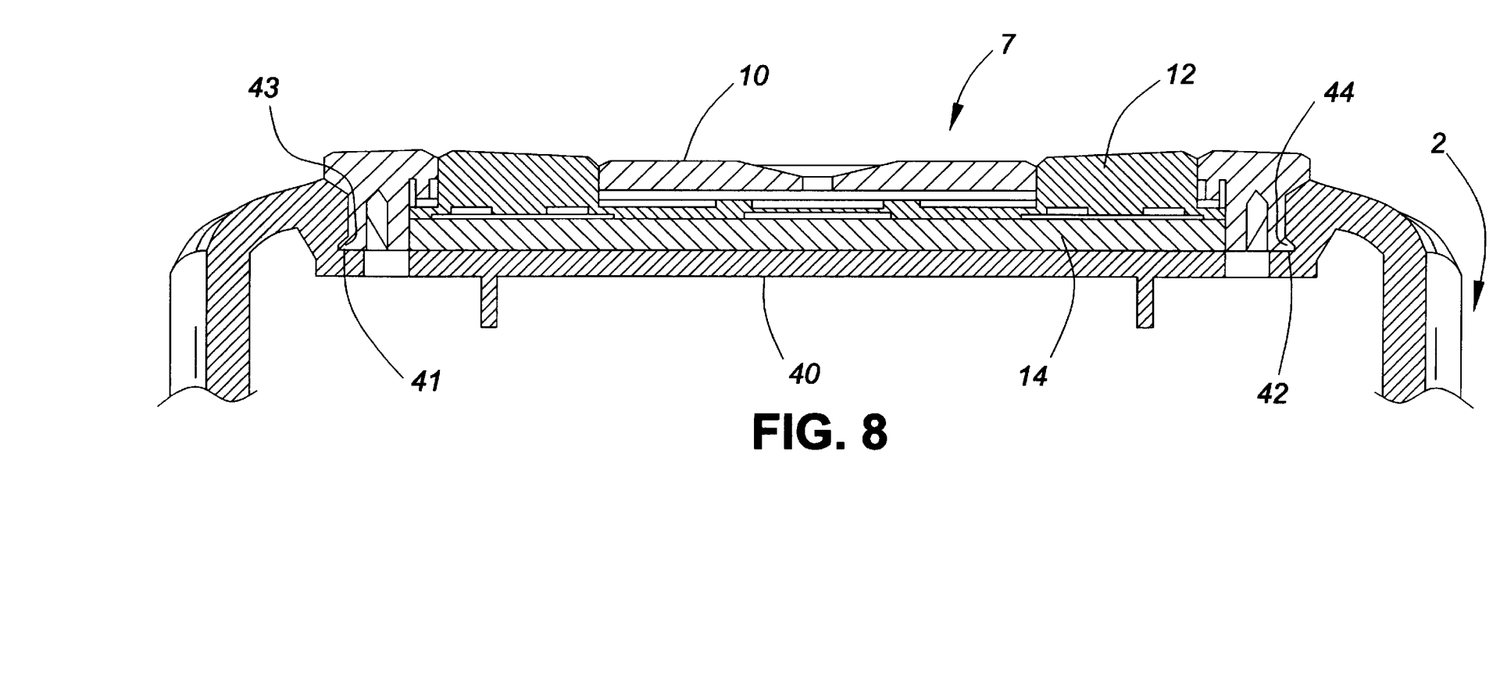
FIG. 8 illustrates in cross-section taken along lines 2—2 in FIG. 2 the sliding extendible section mounted within the housing of the main body.

FIG. 8 is a cross section of the extendible section 7 mounted within the main body 2. Only the portion of the housing 40 for the main body 2 that is relevant to this description is shown. The housing 40 is molded from a material such as a PC/ASB blend to give it strength and resilience. Both inside edges 41 and 42 of the housing 40 have molded channels to receive the outside edges 13 of the casing 10 in a tight fit. Outside edges 13 have pliable flanges 43, 44 along their length to hold the extendible section 7 in place, but to allow it to readily slide within the channels of the main body 2. The pliable flanges 43, 44 along edges 13 are adapted to snap into place within the channels of housing 40. This construction prevents the extendible section 7 from being damaged if the device 1 is dropped or hit when in the open position. If sufficient force is applied to the extendible section 7, it will snap out and detach completely from the main body 2 without breaking the housing 40 or the extendible section 7. In addition, no damage will be done to the circuits since the electrical connections between the main body 2 and the extendible section 7 are not fixed. The operator need only snap the extendible section 7 back into place. This construction has the advantage that the extendible section 7 may be replaced if necessary without the need for expensive technical skills. In addition, this allows the extendible section 7 to be designed to be sacrificial to the wiper contacts 26 to 30 in the main body 2 preventing the need for maintenance to the main body 2 which would have to be disassembled.

Figure 9:
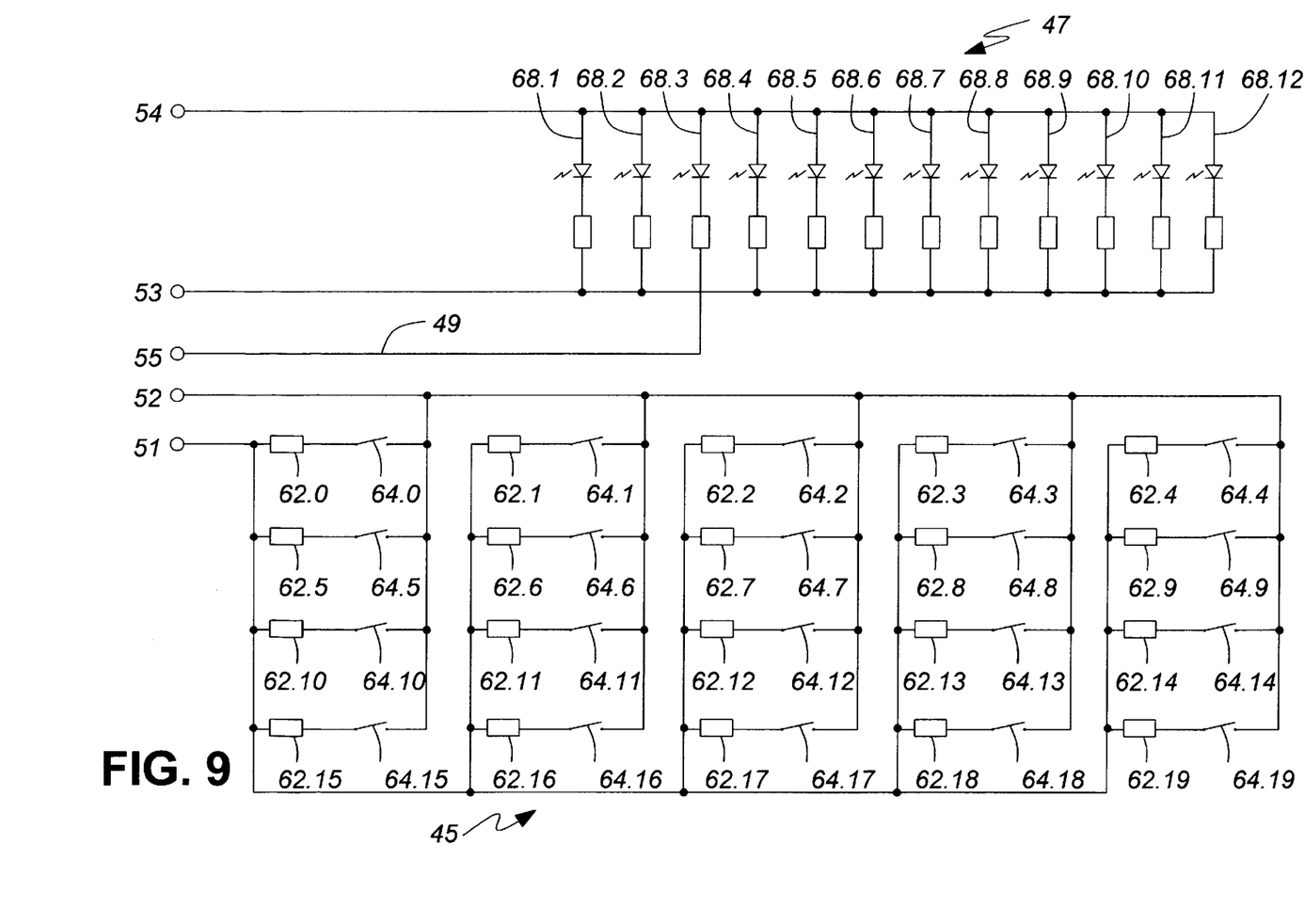
FIG. 9 illustrates in schematic the keypad and LED circuitry on the extendible section circuit board.
Figure 10:
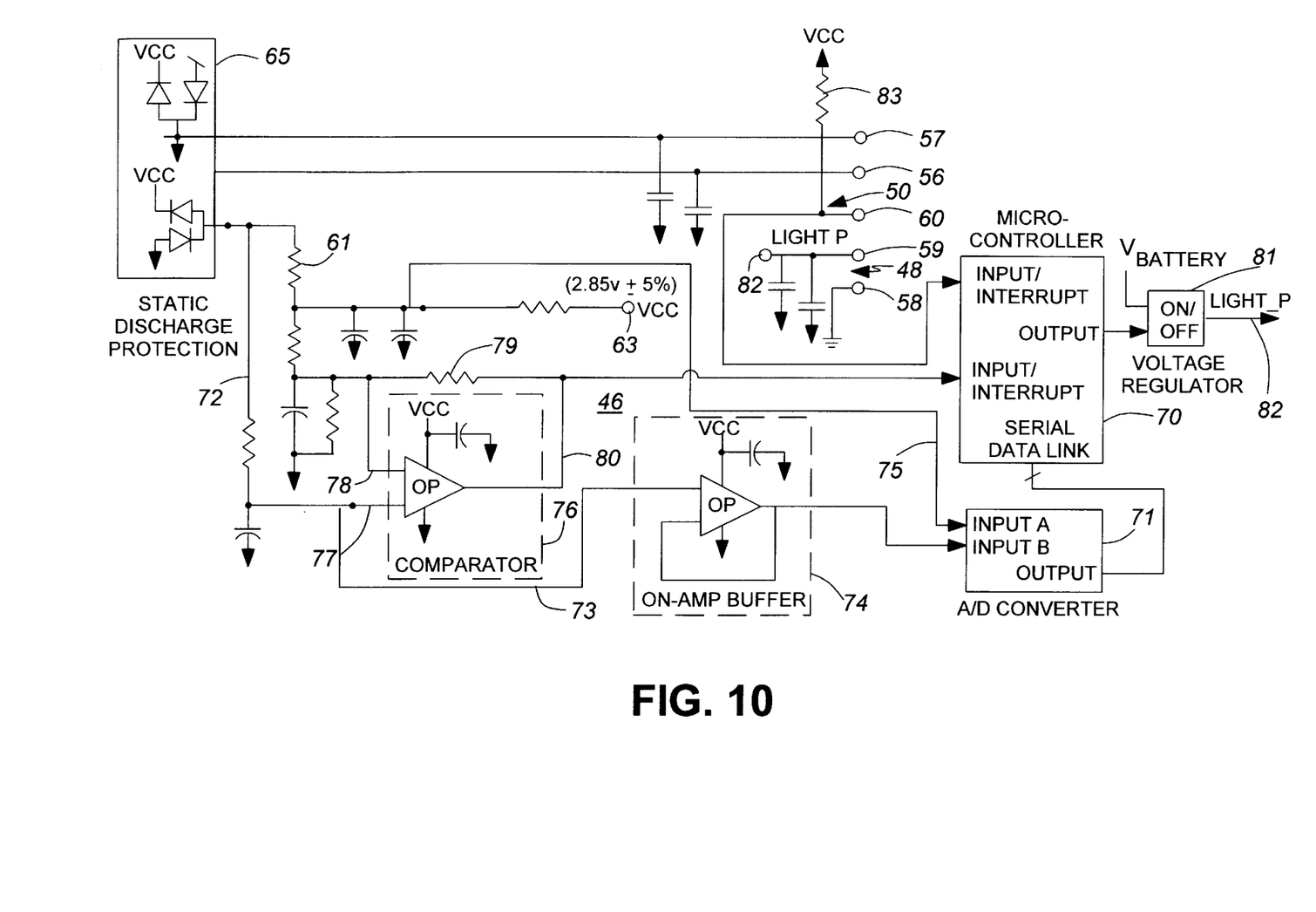
FIG. 10 illustrates in schematic the keypad and LED control circuitry and other electronic components in the main body of the device.

FIGS. 9 and 10 taken together illustrate the keypad circuitry consisting of circuits 45 (FIG. 9) located on the printed circuit board connected to terminals 51 and 52. The corresponding interconnection circuits 46 (FIG. 10) located in the main body 2 are connected to terminals 56 and 57. FIGS. 9 and 10 also illustrate LED circuitry consisting of circuits 47 (FIG. 9) connected to terminals 53 and 54. The corresponding voltage source circuits 48 (FIG. 10) located in the main body 2 are connected to terminals 58 and 59. Finally, FIGS. 9 and 10 illustrate circuitry to indicate when the extendible section 7 is extended and consists of a lead 49 (FIG. 9) connected between terminal 55 and terminal 53 in FIG. 9 as well as circuit 50 (FIG. 10) connected to terminal 60.

In order to make the electrical connection between the main body 2 and the extendible section 7, terminals 56 to 60 are connected to wiper contacts 26 to 30 (FIG. 6) respectively and terminals 51 to 55 are connected to conductive strips 21 to 25 respectively (FIG. 5). However, in the case of terminal 55, it is only connected to the strip section 25c. Strip section 25o is left to float as it is not connected to any circuitry.

The keypad circuitry 45 and 46 is a very low power consumption circuit which can sense the closure of numerous different keys and transmit the information to the microcontroller 70 in the main body 2 of the device 1 using only two conductors through strips 21 and 22 and the corresponding wiper contacts 26 and 27. This circuit will operate reliably over the full temperature range to which the cellular phone is exposed and with only a very low supply voltage of 2.85 VDC±5%.

The keypad circuitry 45 and 46 essentially forms a resistor divider circuit between a 15 K resistor 61 in circuit 46 to an array of resistors 62.0 to 62.19 ranging from 1 K to 200 K ohms in circuit 45. A bias voltage 63 at nominal 2.85V±5% is connected through resistor 61, through terminals 56 and 51 to the array of resistors 62.0 to 62.19. The resistors 62.0 to 62.19 are each connected in series with a single key contact switch 64.0 to 64.19 respectively and to a common ground. The ground is connected to the handset ground in the main body 2 through terminals 52 and 57 to complete the circuit. When any one of the key contact switches 64.0 to 64.19 is pressed, the corresponding resistor 62.0 to 62.19 in the array is connected to ground thus forming a resistor divider circuit with resistor 61. The values of resistors 62.0 to 62.19 are arranged to give a different discrete voltage from the resistor divider circuit when the different key contact switches 64.1 to 64.19 are pressed. The different voltages at terminal 51 resulting from the closing of the individual key contact switches 64.0 to 64.19 are shown in Table 1.

TABLE 1

| Key Contact Switch | Discrete Voltage (volts dc) |
| --- | --- |
| 64.0 | 0.18 |
| 64.1 | 0.31 |
| 64.2 | 0.44 |
| 64.3 | 0.57 |
| 64.4 | 0.70 |
| 64.5 | 0.83 |
| 64.6 | 0.97 |
| 64.7 | 1.09 |
| 64.8 | 1.22 |
| 64.9 | 1.34 |
| 64.10 | 1.48 |
| 64.11 | 1.61 |
| 64.12 | 1.75 |
| 64.13 | 1.87 |
| 64.14 | 2.01 |
| 64.15 | 2.13 |
| 64.16 | 2.26 |
| 64.17 | 2.39 |
| 64.18 | 2.52 |
| 64.19 | 2.65 |

Pressing each subsequent key contact switch 64.0 through 64.19 causes a change of voltage of approximately 130 millivolts from the previous key contact switch. These discrete voltages at 51 are detected at input B of an analog to digital converter 71 in circuit 46 through terminal 56, leads 72 and 73, and op amp buffer 74. In order to eliminate errors due to power supply variations, the supply voltage 63 is applied to input A of the A/D converter 71 through lead 75. Thus the A/D converter 71 takes the ratio between voltage at terminal 51 and the supply voltage 63; the ratio remains constant even with variations in the supply voltage 63. The serial data supplied to the microcontroller 70 is therefore not subject to error due to supply voltage variations.

Another aspect of the circuits 45 and 46 is the manner by which errors due to resistor tolerances are minimized. With the resistors 62.0 to 62.19 arranged in parallel rather then in series, the 1% tolerance of each resistor does not become accumulative. The total tolerance of the resistor divider formed by resistor 61 and one of the resistors 62.1 to 62.19 will only be a maximum of 2%.

The keypad circuitry 45 and 46 generates an interrupt to a mircocontroller 70 when any key 8.0 to 8.19 is pressed. This is useful for standby mode of operation of the device 1, and for reducing microprocessor 70 and A/D converter 71 activity when the keys 8.0 to 8.19 are not being used. In standby mode the device 1 is waiting for user input such as by "Talk" key 8–12 indicating a user initiated call, or input from the cellular system over the radio link to indicate an incoming call. A very low power CMOS comparator circuit 76 is used to generate an interrupt signal for the microprocessor 70. A voltage equal to the supply voltage 63 minus 100 millivolts is applied to one input terminal 78 of the comparator 76. As seen from Table 1, the largest resistor 62.19 will cause a change of 200 millivolts below the 2.85V supply voltage 63 and all other resistors 62.0 to 62.18 will cause a greater voltage change which is applied to the second input terminal 77 of comparator 76. Thus the comparator 76 will detect any change greater than 100 millivolts below the supply voltage and will detect the closure of any keyswitch 64.0 to 64.19 value. There is also an amount of hysteresis of 10 millivolts added to the comparator 76 by resistor 79 in order to ensure only a single transition occurs at the output 80 of the comparator 76 by rejecting any noise on the resistor divider signal. The output of comparator 76 is applied to the microprocessor 70.

In standby mode it is very important that the device 1 consume the absolute minimum of power since it is desirable that the device 1 remain in standby for long periods of time. When the keypad circuitry 45 and 46 generates an interrupt in standby mode it causes the microcontroller to come out of its low power mode. When in the standby mode and while none of the keys 8.0 to 8.19 is pressed, the current consumption of the keypad circuitry 45 and 46 is approximately 228 microwatts.

When a key 8.0 to 8.19 is pressed on the keypad, the current consumption will vary depending on which key is pressed. The power consumption of the entire keypad circuitry 45 and 46 will vary between 274 microwatts to 735 microwatts. Normally any key is only pressed briefly, and after the keypress the power consumption goes back to the standby mode power consumption of only 228 microwatts.

It is to be noted that the keypad circuitry 45 and 46 is continuously interconnected whether the extendible section 7 is in the open or closed positions or anywhere in between. Therefore the keys 8 may be used at any time to operate the telephone functions of the device 1.

In addition, diode discharge protection circuits are connected to terminals 56 and 57 to provide a discharge path for any static electrical charge which may be accidentally applied to the exposed conductive strips 21 and 22 on the extendible section 7.

As described in reference to FIG. 4, the printed circuit board includes a number of LED's 18 which can back light the keys 8.0 to 8.19. FIG. 9 shows a circuit 47 having 12 parallel LED-resistor components 68.1 to 68.12 connected between terminals 53 and 54 which are connected to strips 23 and 24 respectively. A voltage source circuit 48 shown in FIG. 10 is connected between terminals 58 and 59 which are connected to wiper contacts 27 and 28 respectively. Thus the LED circuit 47 is connected to the voltage source circuit 48 at all times, whether the extendible section 7 is in the open or closed position. An on/off switch 81 is therefore used under the control of the microcontroller 70 to provide power to terminal 59 through the switch 81 output 82. The microcontroller 70 is programmed so that the LED's would not normally be energized except when the device is in use and under certain low ambient light conditions.

Terminal 55 is connected to lead 49 and then in turn to terminal 53 which through strip 23, wiper contact 28 and terminal 58 is connected to ground at all times. Strip 25 is divided into two sections 25c and 25o. Strip section 25o is left to float and is not connected to any circuitry. Strip section 25c is connected to terminal 55 (FIG. 9). When the extendible section 7 is in the partially or fully open position, the corresponding wiper contact 30 will be in contact with strip portion 25o, leaving the circuit open. A resistor 83 is connected between the power supply and terminal 60 and with the extendible section 7 partially or fully open, the voltage on terminal 60 is at the power supply voltage of 2.85 volts which is applied to the microcontroller 70. On the other hand, when the extendible section 7 is in the closed position, the corresponding wiper contact 30 will be in contact with strip portion 25c, connecting terminal 60 to ground. In this way the microcontroller 70 will be alerted to the position of the extendible section 7, determining whether the display screen may be partially or wholly used. It is to be noted that if the extendible section 7 is removed from the device 1, the microcontroller 70 will detect an open position allowing the use of the entire screen.

Many modifications in the above described embodiments of the invention can be carried out without departing from the scope thereof, and therefore the scope of the present invention is intended to be limited only by the appended claims.

What is claimed is:

1. A portable wireless communications device comprising:
   a main body including at least a microcontroller and a display screen attached to the microcontroller;
   an extendible section slidably mounted in the main body to cover a significant partial portion of the display screen in a fully non-extended position and extending from the main body in a fully extended position to uncover the entire display screen, the extendible section having a user input component mounted thereon and electrically connected to the microcontroller, said portable wireless communications device being fully functional in both the extended position and the non-extended position.

2. A portable wireless communications device as claimed in claim 1 wherein the user input component consists of a series of function keys.

3. A portable wireless communications device as claimed in claim 2 wherein each key is connected in series with a resistor of different size and the key/resistor combinations are connected in parallel between two leads, the two leads being electrically connected to circuit means within the main body for identifying closed keys.

4. A portable wireless communications device as claimed in claim 3 wherein the extendible section is planar having the function keys mounted on a top planar surface and two elongated parallel conductive strips fixed to the bottom planer surface parallel to the direction of movement of the extendible section, the conductive strips being in contact with wiper contacts mounted within the main body and electrically connected to the circuit means within the main body for identifying closed keys.

5. A portable wireless communications device as claimed in claim 4 wherein the extendible section further includes a series of light emitting diodes mounted to illuminate the keys.

6. A portable wireless communications device as claimed in claim 5 wherein the light emitting diodes are connected to two further elongated parallel conductive strips fixed to the bottom planer surface parallel to the direction of movement of the extendible section, the conductive strips being in contact with two further wiper contacts mounted within the main body and electrically connected to a power supply.

7. A portable wireless communications device as claimed in claim 6 wherein the a fifth elongated conductive strip divided into two sections along its length is fixed to the bottom planer surface parallel to the direction of movement of the extendible section, the conductive strip being in contact with a further wiper contact mounted within the main body and electrically connected to circuit means within the main body to determine whether the extendible section is in the open or closed position.

8. A portable wireless communications device as claimed in claim 7 wherein the main body further includes an audio receiver mounted at one end and a microphone mounted at the other end of the main body.

9. A portable wireless communications device as claimed in claim 1 wherein the extendible section is detachably connected to the main body allowing detachment of the extendible section from the main body on application of a significant force and a subsequent reattachment of the extendible section to the main body.

10. A portable wireless communications device as claimed in claim 9 wherein the extendible section is planar having a user input component mounted on a top planar surface and at least two elongated parallel conductive strips fixed to the bottom planer surface parallel to the direction of movement of the extendible section, the conductive strips being in contact with wiper contacts mounted within the main body to electrically connect the user input component to the microcontroller.

11. A portable wireless communications device as claimed in claim 10 wherein the main body further includes an audio receiver mounted at one end and a microphone mounted at the other end.

12. A portable wireless communications device as claimed in claim 3 wherein the closed key identifying circuit means includes:

resistor means forming a resistor divider with the key/resistor combinations; and detector means for detecting the voltage between the resistor means and the key/resistor combinations to identify the closed key.

13. A portable wireless communications device as claimed in claim 12 which further includes circuit means for sensing the closure of one of the function keys.

14. A portable wireless communications device as claimed in claim 13 wherein the key closure sensing circuit means includes a comparator having first and second input, with the voltage between the resistor means and the key/resistor combination being applied to the first input to produce a comparator output when the first input voltage is less than a fixed voltage applied to the second input.

15. A portable wireless communications device as claimed in claim 14 wherein the comparator output is applied to the microcontroller to activate the communications device.

* * * * *